United States Patent [19]

Alseth et al.

[11] Patent Number: 4,460,390
[45] Date of Patent: Jul. 17, 1984

[54] TWO STAGE AIR CLEANER WITH SIDE-BY-SIDE ELEMENTS

[75] Inventors: Steven M. Alseth, Bloomington; Daniel S. Gauer, Apple Valley; Bruce M. Sullivan, Burnsville, all of Minn.

[73] Assignee: Donaldson Company, Inc., Minneapolis, Minn.

[21] Appl. No.: 431,050

[22] Filed: Sep. 30, 1982

[51] Int. Cl.³ .............................................. B01D 50/00
[52] U.S. Cl. ...................................... 55/323; 55/332; 55/336; 55/431; 55/498; 55/521
[58] Field of Search .................. 55/323, 325, 320, 332, 55/330, 344, 418, 431, 482, 498, 521, 336

[56] References Cited

U.S. PATENT DOCUMENTS

| | | | |
|---|---|---|---|
| 2,034,467 | 3/1936 | Haber | 55/431 X |
| 2,639,779 | 5/1953 | Glanzer | 55/482 X |
| 2,963,111 | 12/1960 | Rohrbacher | 55/498 X |
| 3,339,347 | 9/1967 | Otto, Jr. | 55/418 X |
| 3,378,994 | 4/1968 | Farr | 55/431 X |

FOREIGN PATENT DOCUMENTS 932629 3/1948 France ................................. 55/320

Primary Examiner—Kathleen J. Prunner
Attorney, Agent, or Firm—Merchant, Gould, Smith, Edell, Welter & Schmidt

[57] ABSTRACT

A two-stage air cleaner with side-by-side elements. The cleaner has a first element (30), a second element (32) which itself may have a safety element (35). The first element (30) is preferably a conical inertial separator having a scavenge outlet (38). The second element preferably employs a pleated filter (50) which receives cleaned air (indicated by arrows 104) which passes through the filter (as indicated by arrows 106) to the outlet tube (56). In an alternative embodiment, pleated filter (50a) may have a reverse taper corresponding to that of the conical inertial precleaner (30a), thereby reducing the size of the housing.

14 Claims, 5 Drawing Figures

TWO STAGE AIR CLEANER WITH SIDE-BY-SIDE ELEMENTS

TECHNICAL FIELD

The present invention relates to the field of air cleaners, more specifically two stage filter systems.

BACKGROUND OF THE INVENTION

Air cleaners, particularly those which are attached to vehicles, are subject to special requirements as a result of their environment. While being able to effectively filter the air, they must also be small enough to permit attachment to the vehicle without creating an obstruction or significant air drag. Further, they must be capable of simple and reliable filter replacement so that inexperienced users will not cause damage to the vehicle by improper installation of new filter elements. The solution to providing a high degree of filtration can be found in the use of two stage filtering systems, the first stage being an inertial or centrifugal filter and the second being filter media. A previous attempt to solve these problems was proposed in U.S. Pat. No. 3,190,058, issued to Farr et al, which discloses an inertial precleaner disposed inside of a pleated paper filter element which is concentric therewith. The Farr device does not meet the required criteria because of the large overall dimensions required of the filter housing due to the concentric configuration. Furthermore, replacement of the second-stage filter element requires the housing to be completely opened and thereafter resealed. Such an arrangement relies heavily on several important sealing points which may not be properly seated by inexperienced users. Furthermore, there is no efficient way to prevent casual entry of particulate matter during the period the filter element is being replaced.

The present invention, as disclosed herein, overcomes many of these deficiencies by providing a two stage filtering system with first and second stages in a side-by-side relationship, thereby reducing the overall package size, and by providing a different airflow pattern which requires fewer seals to be effective.

SUMMARY OF THE INVENTION

The present invention is in one embodiment directed to an air cleaner assembly having a teardrop-shaped housing and first and second ends, the first end having an air inlet opening and the second having an air scavenge opening smaller than the inlet, and one of the ends having an air outlet opening. The cleaner also has a first cleaning means located between the inlet and scavenge openings in an airtight abutment therewith and a second cleaning means located within the housing includes communication with the first means having a central opening disposed an airtight abutment with the outlet opening of the housing.

According to further aspects of the invention, the teardrop-shaped housing may be formed of two arcuate portions having concave surfaces facing each other and connected by generally straight lines. Alternatively, the housing may be oval shaped wherein the arcuate portions are of equal size.

Various advantages and features of novelty which characterize the invention are pointed out with particularity in the claims annexed hereto. However, for better understanding of the invention, its advantages and objects, reference should be had to the drawings and to the accompanying descriptive matter described in the preferred embodiment of the invention.

BRIEF DESCRIPTION OF THE DRAWINGS

The specific embodiments of the invention have been chosen for the purpose of illustration and description, and are shown in the accompanying drawings forming a part of the specification wherein.

DETAILED DESCRIPTION

Figure 1:
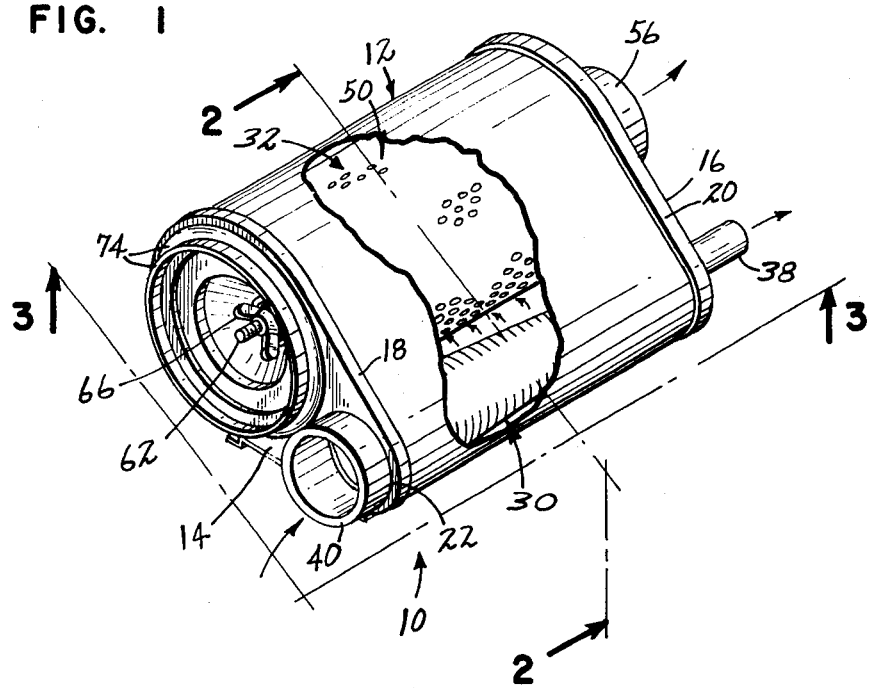
FIG. 1 is a perspective view of one embodiment with portions broken away of the present invention.
Figure 5:
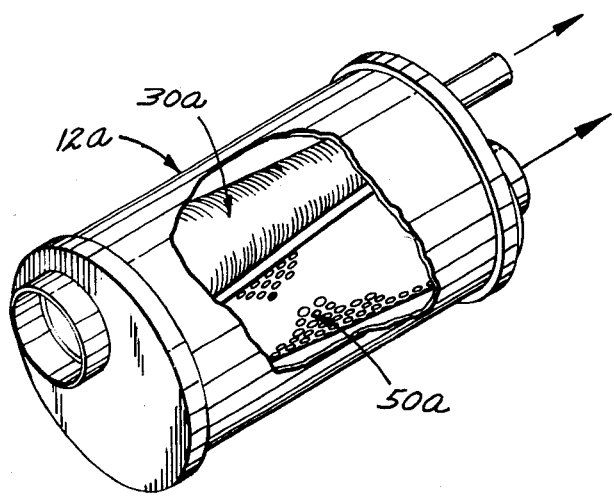
FIG. 5 is a perspective view of a third embodiment with portions broken away of the present invention.

FIG. 1 discloses generally a preferred embodiment of the two stage air cleaner 10 having an outer teardrop-shaped housing 12, preferably of metal, but in any case an air impervious material. Housing 12 is preferably formed in a shape as indicated in the FIGURE which could be described as a pair of opposed arcuate sections connected by straight, but not parallel, lines. The arcuate portions may be semicircular such as shown in FIG. 5, numeral 12a; however, they may also be elliptical or other forms, such as might be commonly used in an automobile muffler. The semicircular form, however, provides most efficient utilization of space.

Forming sidewalls to filter system 10 are ends 16 and 14, each having a lip 18 and 20 extending perpendicularly from the outer periphery of the ends overriding member 12 thereby providing the basis for an airtight joint. Ends 14 and 16 may be welded or otherwise affixed to member 12 to provide an integral housing.

End 14 has two apertures, an air inlet 22 and an access 24. End 16 also has two apertures, 26 for a scavenge outlet, and 28 for a clean air outlet. These outlets are more clearly shown in FIG. 3.

Figure 2:
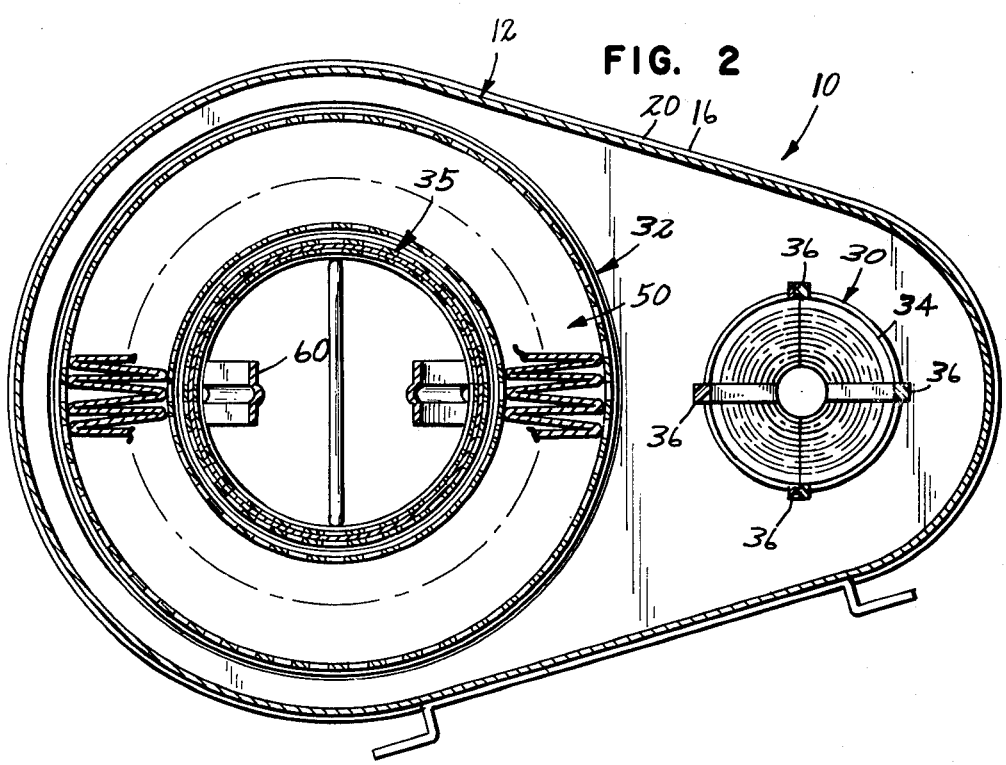
FIG. 2 is a sectional view taken along lines 2—2 of FIG. 1.
Figure 3:
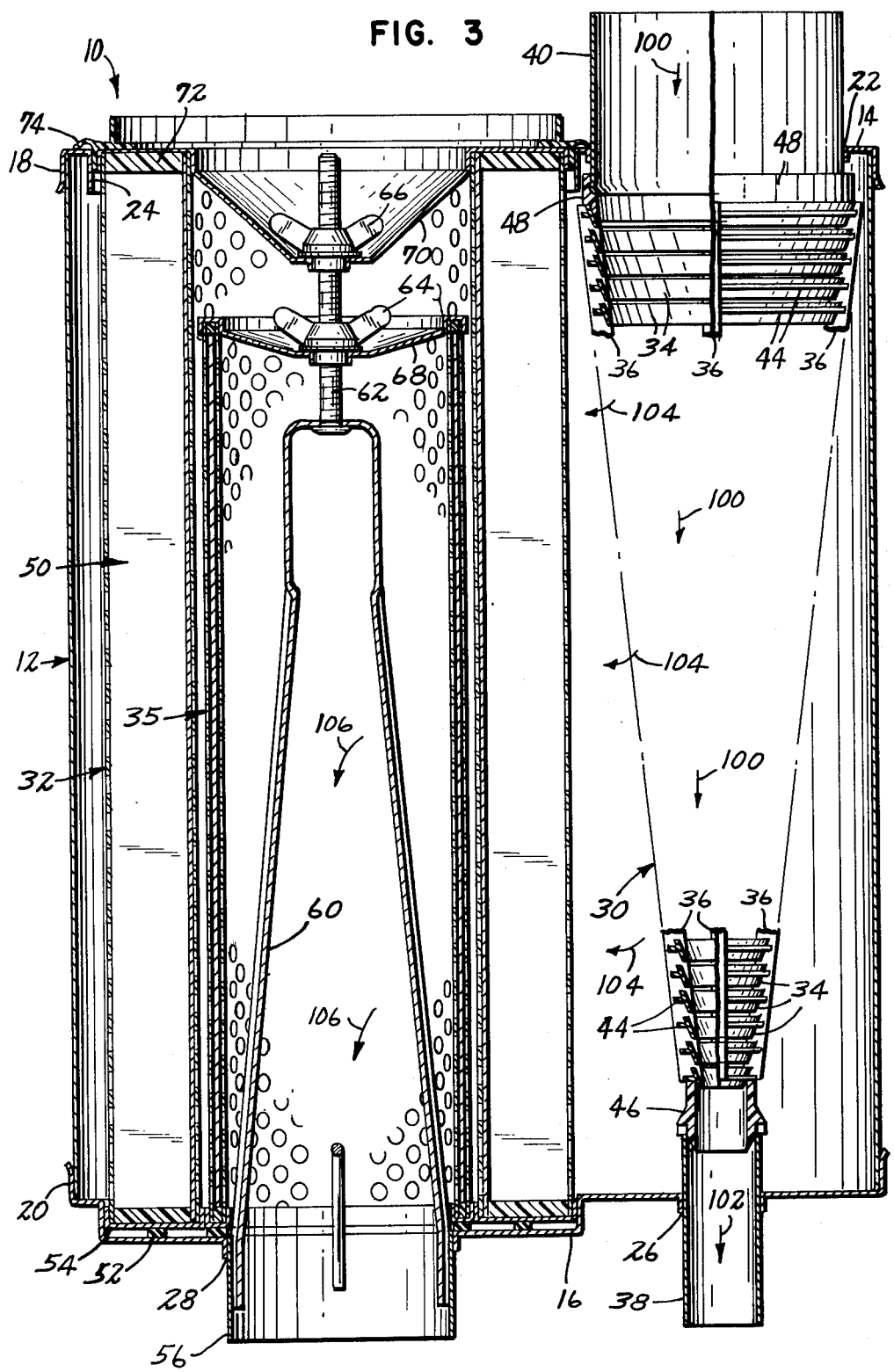
FIG. 3 is a sectional view taken along lines 3—3 of FIG. 1.

Turning to FIGS. 2 and 3, there can be seen the first stage element 30 and second element 32. In this embodiment, the second element includes a safety element 35.

The first cleaning element is as shown in FIG. 3, an inertial separator in the shape of a truncated cone. Element 30 may also be made of filter media. In the preferred embodiment, however, element 30 is comprised of a plurality of truncated conical elements 34 which are located adjacent its next preceding like element and held in place by a plurality of linear supports which extend from the scavenge outlet tube 38 to the inlet tube 40. In the preferred embodiment, there are four equally spaced support members 36 which are affixed to the conical elements 34 at their points of contact by adhesive or other means.

Although not shown in the drawings, it is possible to have a sock-like filter screen applied along the inside peripheral surface of the first cleaning member 30 for additional filtering.

Each conical element 34 is affixed on supports 36 adjacent but not in contact with neighboring elements. This provides a passage for air flow. Each conical element 34 preferably has a flange affixed to its outer periphery and extending outwardly therefrom. This flange 44 is preferably oriented orthogonally to the central axis of the first cleaner element 30, which is defined as extending through the cleaner from the inlet to the scavenger end. By providing this flange 44, the air flow is altered so as to maximize the inertial cleaning effect of the element. It is also preferable to locate flange 44 approximately midway between the leading and trailing edge of each conical element 34. The operation of inertial cleaning elements, also known as conical pocket dust louvres, is well-known in the prior art and will therefore not be explained herein.

The first and smallest conical element 34 rests upon support piece 46, which is preferably a resilient material. Support 46, in turn, is seated on scavenge tube 38 which may be welded to opening 26. The resilience of support 46 provides a compression fit of the cleaning element 30 between its inlet and scavenge ends. At the inlet end, the last and largest conical element 34 abuts a seating member 48 which, in turn, abuts inlet tube 40 which itself may be welded to opening 22 in the housing end.

Turning to the second stage of the filter system, the second cleaner element 32 preferably comprises a first cylindrically shaped pleated paper filter 50 of the type known in the prior art. In this embodiment, the filter is open at both ends and means are provided for sealing. It is also possible to provide a tubular filter 50 with one end sealed. Filter 50 preferably includes a resilient sealing member 52 at its end 54 which engages end 16 of the housing. Clean air opening 28 includes a tube 56 which is intended to be attached to the air intake on the engine or machine to be used. Extending from tube 56 is a yoke assembly 60 having a threaded bolt 62 and a pair of wing nuts 64 and 66 which compress a pair of end plates 68 and 70.

End plate 70 is adapted to provide an airtight seal of end 72 of filter 50. In a preferred embodiment, plate 70 may, in fact, be affixed to end 72 of the filter by adhesive and have sealing element 74 likewise there affixed. Seal 74 provides for an airtight fit between the filter 50 and end 14.

Removal of pleated filter 50 is accomplished by removing wing nut 66 and end plate 70, thus lifting the filter out of the housing. Notice that safety filter 35 located concentric with filter 50 remains over the outlet tube 56 to prevent contamination from entering the engine during filter replacement. In addition, note that the effectiveness of filter 50 is dependent only upon seals 52, 74 located around the outlet tube, and end plate 70 or the alternative sealed end of the cylindrical filter.

In operation, air enters inlet tube 40 as indicated by arrows 100. A portion of the air exits the scavenge tube at outlet 38, as indicated by arrow 102, carrying the heaviest particulate matter. The cleaner air, which contains smaller particulate matter having a low inertia, is drawn through the spaces between the louvres, or conical elements 34, as indicated by arrows 104. Air then enters pleated filter 50, collecting most of the remaining particulate matter in the filter media as it heads toward the central axis of the filter. As a final safeguard, the air must pass through safety filter 35 and into the outlet tube as indicated by arrows 106.

Figure 4:
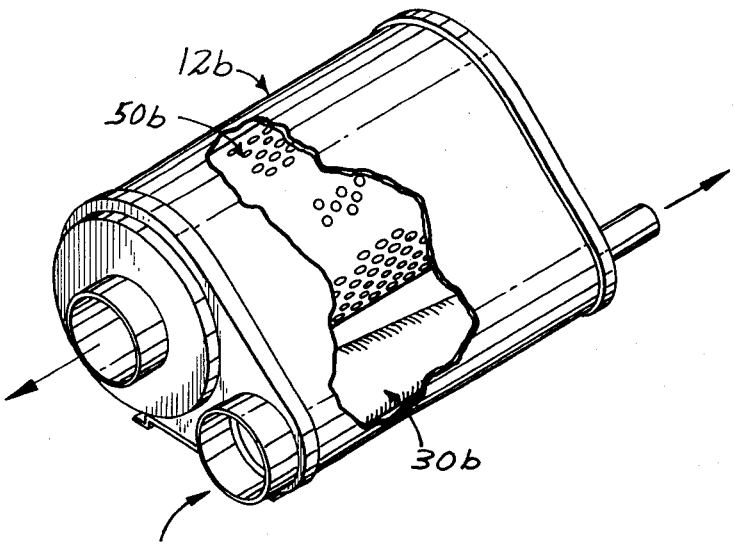
FIG. 4 is a perspective view of a second embodiment with portions broken away of the present invention.

As an alternative, in some installations, it is desirable to reverse the location of the outlet tube so as to be on the same end as the inlet tube as shown in FIG. 4, number 12b. The access 24 is then put on the opposite side and filter 50b and element 30b correspond generally to element 50 and element 30 respectively in the previous embodiment; however, the operation is essentially unchanged.

ALTERNATIVE EMBODIMENT

FIG. 5 illustrates an alternative embodiment which may be employed to reduct the overall dimensions of the housing. To the extent elements of this embodiment are similar to the previous embodiment, they will not be reiterated. In FIG. 5, cylindrical housing 12a has a slightly different shape which is achieved by making the maximum diameter of the first cleaning element 30a equal to the maximum diameter of pleated filter 50a. Filter 50a is also formed in the shape of a truncated cone similar in shape of that of 30a, however, with a reverse taper so that both 50a and 30a can be brought into close relationship, thereby reducing the overall dimensions of the housing. With the filters as shown, cylindrical housing 12a appears to have the form of two arcuate members of equal size joined by curved lines. The arcuate members may be joined by straight lines. If the diameters of the filters are small enough they may be semicircular and the lines joining them will be curved.

While there is shown certain preferred embodiments, it will be understood that the same is capable of modification without departure from the scope and spirit of the invention as defined in the claims.

What is claimed is:

1. An air cleaner assembly comprising:
   (a) a housing in the shape of a pair of arcuate portions with concave surfaces opposing, said housing having first and second ends, said first end having an air inlet opening and said second end having an air scavenge opening smaller than said inlet opening, one of said ends having an air outlet opening;
   (b) a first air cleaning means located between said inlet and scavenge openings, and in airtight abutment therewith; and
   (c) a second air cleaning means located within said housing adjacent and in fluid communication with said first cleaning means and having a central opening disposed in airtight abutment with said outlet opening.

2. The assembly according to claim 1 wherein said pair of arcuate portions includes a first arcuate path and a second arcuate path, said paths having their concave surfaces facing each other, said arcuate portions being connected by generally straight, nonparallel lines.

3. The assembly according to claim 2 wherein said first and second arcuate portions are semicircular in shape, said first and second portions being generally centered on axes defined by the central axis of said first and second cleaning means, respectively.

4. The assembly according to claim 3 wherein said second arcuate portion is larger than said first arcuate portion.

5. The assembly according to claim 4 wherein said first cleaning means is an inertial separator.

6. The assembly according to claims 1 or 3 wherein said first cleaning means is generally in the shape of a truncated cone.

7. The assembly according to claim 1 wherein said housing is generally teardrop shaped and wherein said second air cleaning means includes a filter element generally in the shape of a truncated cone of decreasing diameter from said second end to said first end, and wherein said first air cleaning means includes an inertial separator generally in the shape of a truncated cone having a decreasing diameter from said first end to said second end, so that said housing circumference may be minimized by the adjacent positioning of said first and second cleaning means.

8. The assembly according to claims 1 or 3 or 10 wherein said second cleaning means is a filter element cylindrical in shape, one end of which being air impervious, the remaining end having an aperture sized to mate with said outlet opening in an airtight relationship.

9. The assembly according to claim 8 wherein said second cleaning means includes a further safety filter element disposed inside said cylindrical filter element.

10. The assembly according to claim 9 wherein said cylindrical filter element and safety filter is retained biased against said second end aligned with said outlet opening by a yoke extending from said second end toward said first end aligned on the central axis defined by said safety filter.

11. An air cleaner comprising:
 (a) a housing in the shape of a pair of arcuate portions with concave surfaces opposing, said housing also having 1st and 2nd ends, said 1st end having an air inlet opening, said 2nd end having an air scavenge opening smaller than said inlet opening, one of said ends having an air outlet opening;
 (b) a conically shaped inertial cleaning means comprising a plurality of cylindrical louvers disposed adjacent each other sharing the same central axis, said louvers providing a fluid passageway from their inner to their outer surface, the downstream narrower end of said cleaning means being connected to said scavenge opening and the upstream wider end of said cleaning means being connected to said air inlet opening; and
 (c) air filtering means having clean and dirty air sides, said clean air side being in communication with said air outlet opening and said dirty air side being in communication with air passing thru said louvers.

12. A cleaner according to claim 11 wherein each of said louvres includes a truncated conical member having an outer peripheral surface, a circumferential radial flange extending outwardly from said surface and said flange being oriented generally orthogonally to the central axis of said inertial cleaning means.

13. A cleaner according to claim 12 wherein said plurality of truncated conical members are located adjacent each other with space between each succeeding member and wherein said members are maintained in such position by a plurality of linear members extending the length of said inertial cleaning means located spaced around said conical members and affixed thereto at points of contact.

14. A cleaner according to claim 11 wherein said filter means is a conically shaped filter element having its wider end adjacent the narrower end of said inertial cleaning means and its narrower end adjacent the wider end of said inertial cleaning means.

* * * * *